United States Patent
Itoh et al.

[11] Patent Number: 6,057,898
[45] Date of Patent: May 2, 2000

[54] MULTIPANEL LIQUID CRYSTAL DISPLAY DEVICE HAVING A GROOVE ON THE EDGE SURFACE

[75] Inventors: Goh Itoh; Kazuki Taira; Rei Hasegawa; Yukio Kizaki; Yujiro Hara; Miki Mori, all of Kanagawa-ken, Japan

[73] Assignee: Kabushiki Kaisha Toshiba, Kawasaki, Japan

[21] Appl. No.: 09/141,022

[22] Filed: Aug. 27, 1998

[30] Foreign Application Priority Data

Aug. 29, 1997 [JP] Japan ............................ 9-234283

[51] Int. Cl.$^7$ ............................................. G02F 1/13
[52] U.S. Cl. ............................ 349/73; 349/160; 349/153
[58] Field of Search .......................... 349/73, 153, 154, 349/74, 160

[56] References Cited

U.S. PATENT DOCUMENTS

| | | | |
|---|---|---|---|
| Re. 34,690 | 8/1994 | Carrington | 349/154 |
| 3,861,783 | 1/1975 | Dill et al. | 349/156 |
| 5,106,197 | 4/1992 | Ohuchida et al. | 349/73 |
| 5,169,693 | 12/1992 | Fujimura | 349/154 |
| 5,450,222 | 9/1995 | Sirkin | 349/150 |
| 5,706,069 | 1/1998 | Hermens et al. | 349/153 |
| 5,742,006 | 4/1998 | Grupp et al. | 174/52.2 |

FOREIGN PATENT DOCUMENTS

| | | |
|---|---|---|
| 7-159795 | 6/1995 | Japan . |
| 8-211395 | 8/1996 | Japan . |

*Primary Examiner*—Kenneth Parker
*Attorney, Agent, or Firm*—Oblon, Spivak, McClelland, Maier & Neustadt, P.C.

[57] ABSTRACT

Large size flat display panels are used in many technical fields, with television (TV) sets, personal computers (PCs) and advertising equipment. A multiple panel display device has been developed which employs a plurality of separate flat-surface display panel modules united by adhesion together into a matrix array of rows and columns. Juncture sections of the panels have non-displayable regions between adjacent ones of the panels. To avoid seam lines visible to the human eye, the seams are minimized in width. To this end, the peripheral ends of display panels are provided with a concave/projection configuration or gap for limiting excessive expansion of a sealing material used. This significantly reduces the width of such non-display region at the juncture section of neighboring display panels bonded together.

5 Claims, 15 Drawing Sheets

MULTIPANEL LIQUID CRYSTAL DISPLAY DEVICE HAVING A GROOVE ON THE EDGE SURFACE

BACKGROUND OF THE INVENTION

1. Field of the Invention

The present invention relates to multiple panel liquid crystal display (LCD) devices with a plurality of LCD panels bonded and united into a single integral large size display.

2. Discussion of the Background

Conventionally, cathode-ray tube (CRT) units, LCDs and plasma display devices have been widely used as output units for visual representation of images in audiovisual (AV) equipment and office automation (OA) equipment. The trend of these display devices is for less weight, less thickness, higher precision, and larger screen size.

When a large screen display device using a single piece of LCD panel is manufactured, the uniformity of the resultant display screen may decrease. To avoid this difficulty, a large screen display device is typically a multiple panel type which includes a plurality of display panel modules organized into a two-dimensional (2D) matrix form.

One typical prior known large screen LCD device is shown in FIG. 19a, which depicts in a cross-sectional view the edge section of one of multiple LCD panels used therein. A plan view of the part is shown in FIG. 19b.

As shown in FIG. 19a, two dielectric substrates 180, 181 are laminated above each other and bonded together by a chosen sealing material 182 at the edges thereof. However, as shown in FIG. 19b, when seen from a planar viewpoint, the sealing material 182 remains irregular in expansion along the surface. Thus, the width of a bonding section is required to be carefully designed in view of such expansion irregularity of the sealing material 182.

In the case a plurality of panels are bonded together on the same plane, the width of a black matrix is typically determined so that this width covers a corresponding bonded section rendering it invisible. More specifically, as shown in FIG. 19c, which illustrates a top plan view and side view of multiple panels bonded together, a certain part D including a substrate junction width DB and liquid crystal seal widths DS1, DS2 (D=DB+DS1+DS2) is defined as the junction region. This junction width D is the width of such black matrix in the junction region.

FIGS. 20a–20c are a side view of a substrate before cutting, a side view during cutting of the substrate and a top plan view of the substrate, respectively, illustrating an irregularity of the expansion of the sealing material at a cut edge of the substrate processed using a prior art cutter machine. Also, as shown in FIG. 20, using cutting machines, such as a dicer 192, can result in a discontinuous fracture or fault 193 (referred to as "burr" hereinafter) on the substrate edge surface. This is another factor that determines the junction width D. In such region with the burr 193 created, it is difficult to fabricate pixel electrodes so that this region is left as a non-displayable region in most cases.

In this way, the black-matrix width is determinable by either one of the irregular sealing material expansion region and the burr region which is wider than the other.

In such display devices with multiple LCD panels united by bonding, the junction regions D are uncontrollable for the transmissivity of light. This results in a region that is different in display image from those regions with liquid crystal, which in turn leads to a decrease in display characteristic such as contrast reduction. Thus, the need exists for forming a light shield film in junction regions on an array substrate that supports thereon an array of multiple LCD panels, or alternatively, on opposed substrates opposing the array substrate.

In addition, it is also necessary even for a part other than the junction regions to selectively provide a similar light shield film overlying a pattern of electrical interconnection leads in order to eliminate leakage of light rays from nearby lead portions. Unfortunately, this does not come without an accompanying penalty: when the light shield film is varied in pattern width and period between junction regions and the remaining regions, the light shield film pattern becomes observable lower in the quality and precision of images displayed.

To avoid this problem, one approach is to fabricate a specifically designed light shield pattern that is kept identical in width between junction regions and the remaining, non-junction regions, i.e., displayable regions. Even in this case, however, the junction region width D is approximately 0.3 millimeters (mm); accordingly, use of such "wide" light shield pattern on the entire surface of a multipanel display device reduces the total aperture ratio of displayable regions. The less the aperture ratio, the less the resultant brightness. Thus, a light source behind the panels, i.e., backlight, must be enhanced in intensity of output light. Obviously, this results in an increase in power dissipation.

SUMMARY OF THE INVENTION

The present invention is directed to a liquid crystal display (LCD) device of the multipanel type which includes a matrix of rows and columns of LCD panels bonded together, each being sealed by a seal material. The present invention controls extensive expansion of the sealing material by using a step-like configuration structure as provided in a junction region between adjacent ones of the LCD panels. The step-like structure may include a concave "groove" or projected "ridge" as provided at the edge section of each panel, or alternatively, a structure with a stair-step-like surface configuration. With such an arrangement, it is possible to provide an improved large-screen flat-surface display device, such as LCD device, which is reduced in area of non-displayable regions at junction sections.

In accordance with one aspect of the invention, a multipanel LCD device has a groove formed in the end surface of at least one of opposing substrates.

Alternatively, the device may be arranged so that a groove is formed at the end of the substrate surface.

The device may be modified so that the groove in the substrate end surface of one panel is engageable with its corresponding groove as provided at the substrate end face of another panel next thereto.

In accordance with another aspect of the present invention, a stair-step-like configuration structure may be provided at the substrate edge section.

The present invention is also drawn to a technique for connecting signal transmission lines and/or an opposed substrate of a display panel to its neighboring panel.

BRIEF DESCRIPTION OF THE DRAWINGS

FIG. 1b is a diagram showing a perspective view of one junction section of the device shown in FIG. 1a.

FIG. 3b is a plan view of a bottom substrate of the display panel shown in FIG. 3a.

FIG. 4b is a corresponding plan view of the structure of FIG. 4a.

DETAILED DESCRIPTION OF THE PREFERRED EMBODIMENTS

A liquid crystal display (LCD) device of the present invention relates to a large-screen LCD device with a two-dimensional (2D) matrix of rows and columns of LCD panels bonded together at edges thereof. Also, the LCD device incorporates the principal concept of the present invention for controlling undesired excessive expansion of a sealing material by using a concave "groove" or a projected "ridge."

Several preferred embodiments of the present invention are described in detail with reference to the accompanying drawings.

A first embodiment of the present invention is principally directed to an LCD device with a bonding area increased by providing a serpentine configuration at the bonding sidewall in each junction between adjacent ones of an array of LCD panels organized into a 2D matrix.

With this embodiment, the bonding area of neighboring panels is increased thus enabling a tight junction therebetween using a reduced amount of sealing material. Here, the sealing material is a chosen adhesive that provides both adhesion and sealing functions. This may suppress formation of "burr" portions due to overflow or excessive expansion of the sealing material and reduce the waste of sealing material while minimizing contaminants on the substrates. In addition, the adhesion strength is increased.

Figure 1A:
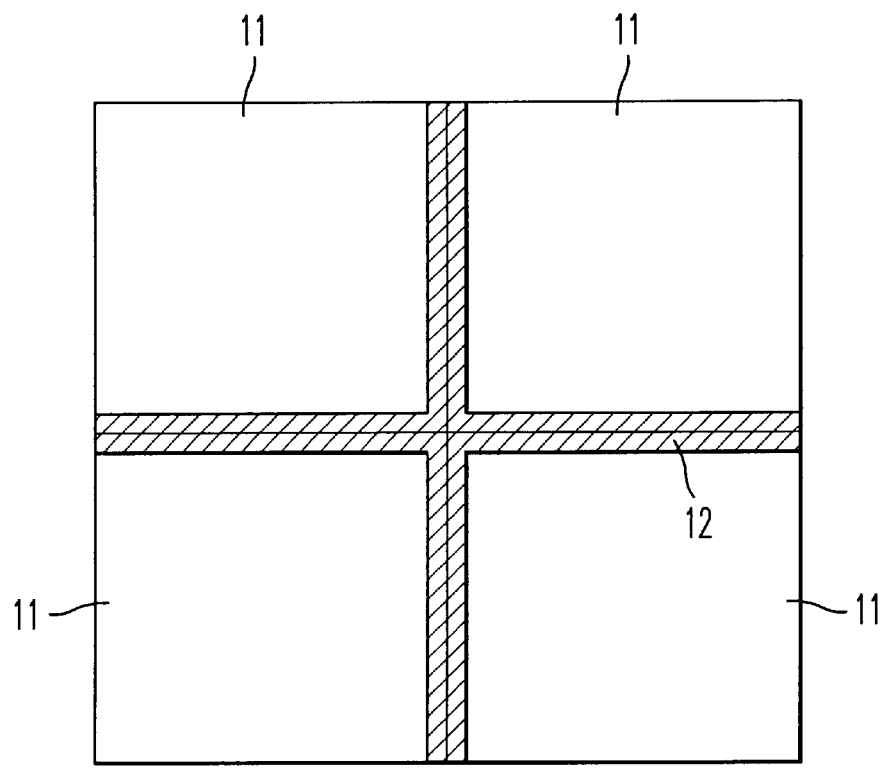
FIG. 1a is a diagram showing a plan view of a multipanel large-screen flat-surface display device in accordance with a first embodiment of the present invention.

FIG. 1a is a diagram showing a plan view of a multipanel large-screen flat-surface display device in accordance with a first embodiment of the present invention. As shown in FIG. 1a, the LCD device embodying the present invention comprises an ensemble of rows and columns of flat-surface display panels 11 bonded together at junction regions 12 between neighboring ones of the panels 11 and thus organized into a 2D matrix array. Only four (2×2 matrix) panels 11 are shown in FIG. 1a for purposes of illustration only. Each display panel 11 is an LCD having upper and lower glass substrates laminated above each other with a chosen liquid crystal material (not shown) sealed in a "thin" gap space defined therebetween.

Figure 1B:
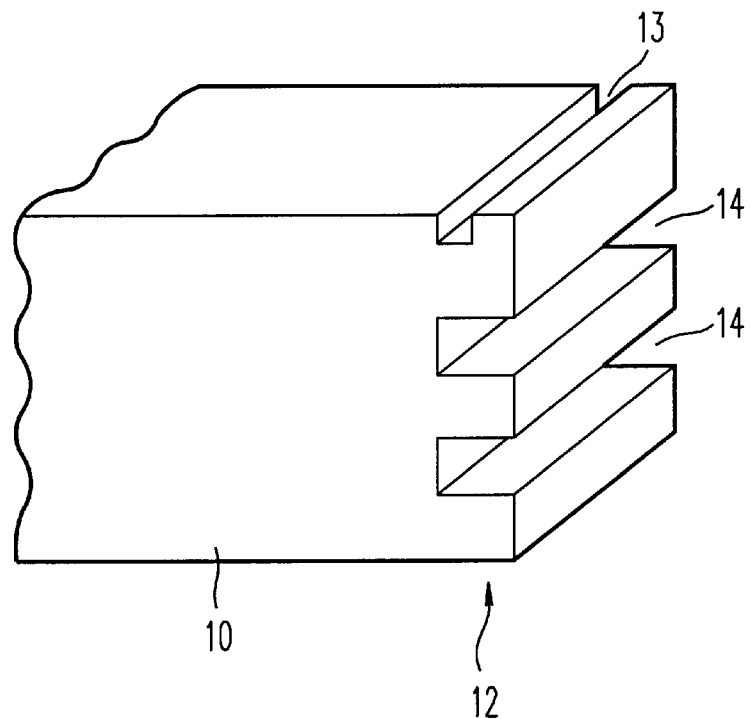

FIG. 1b is a diagram showing a perspective view of one junction section of the device shown in FIG. 1a, and depicting the bonding edge face of one such glass substrate. Each substrate 10 has a first groove 13 in a top surface in the junction region 12, and also has at least one second groove 14 in a side surface. Note here that the first and second grooves 13, 14 may be formed by currently available fabrication techniques, including methods for defining grooves in dielectric substrate surfaces using dicer machines, dry etching techniques, and wet-etching patterning methods, and the like.

Adhesive is injected into the first groove 13 and the second grooves 14 to bond neighboring LCD panels 11 together. At this time, the first groove 13 prevents excessive expansion of a sealing material used, thus enabling the junction region 12 to decrease in width.

Figure 2:
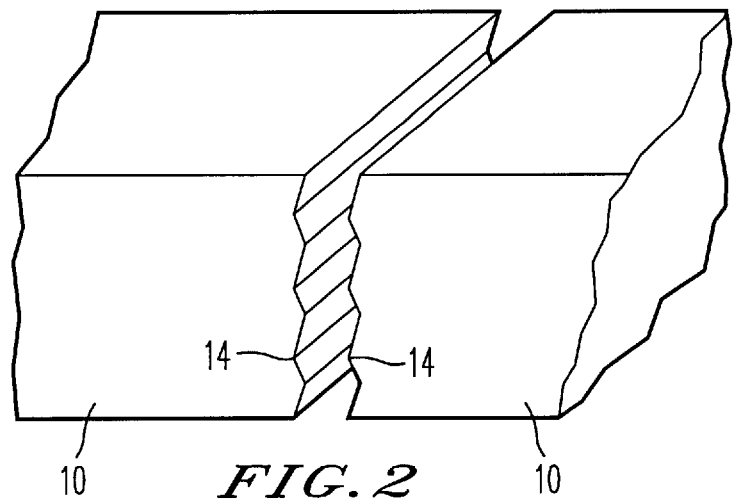
FIG. 2 is a diagram showing a partial perspective view of opposite end faces of substrates of a multipanel display device in accordance with a second embodiment of the present invention.

FIG. 2 is a diagram showing a partial perspective view of opposite end faces of substrates of a multipanel display device in accordance with a second embodiment of the present invention. The second embodiment shown in FIG. 2 is arranged in a way such that the second grooves 14 of FIG. 1b are modified in shape to have a sawtooth-wave-like cross section on the bonding region side surface of each substrate edge. In this case the first groove 13 may be optionally provided. With such a structure having the engageable complementary "zigzag" surface configurations, the bonding area may be increased, whereby the amount of adhesive used for bonding neighboring panels is reduced. This in turn reduces the required amount of adhesive to decrease unwanted overflow of extra adhesive components onto the dielectric substrate surface. Simultaneously, the bonding area increases thereby likewise increasing the strength of adhesion.

In the above embodiments, the second grooves in the panel side surface may increase the area of adhesion with its neighboring display panel thus reducing the amount of sealing material as compared to prior art devices. This avoids waste due to overflow of such sealing material while suppressing contaminants on the substrates. Accordingly, in the multipanel LCD device having a matrix of plural display panels with neighboring panels tightly adhered together and sealed using a chosen sealing material, it becomes possible to increase the adhesion strength thus increasing the overall physical strength of the multipanel LCD device. Furthermore, using the first and second grooves 13 and 14 may eliminate unwanted excessive expansion and/or leakage of the sealing material thereby reducing non-displayable regions. Thus, it is possible to eliminate the degradation of image quality at bonded sections of the LCD device.

A third embodiment of the present invention is aimed at elimination of formation of expansion irregularities of a sealing material at the terminate ends of displayable regions after sealing dielectric substrates with a liquid crystal disposed therebetween.

In the example below, there is explained either the junction of neighboring LCD panels or bonded sections of upper and lower substrates of an LCD panel.

A third groove is provided in the inner surface of at least one substrate and also within a junction region for bonding neighboring LCD panels. A main feature of the LCD device lies in that the opposing LCD dielectric substrates are bonded together at a part to which a sealing material is attached, to thereby permit any extra sealing material components to overflow into the third groove. With such an arrangement, it becomes possible to eliminate excessive expansion of the sealing material by using a configuration structure formed by the third groove which is present in the bonded region of the dielectric substrates. This in turn makes it possible to reduce or minimize the expansion area of the sealing material thereby rendering resultant "seam" lines invisible to human eyes.

One practical form of this device structure is explained in more detail below.

Figure 3A:
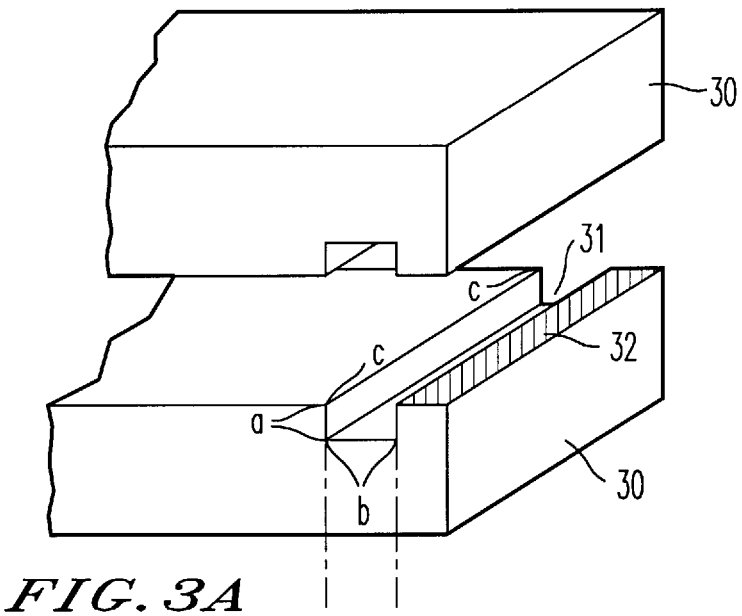
FIG. 3a shows a perspective view of a peripheral section of a display panel in accordance with a third embodiment of the present invention.
Figure 3B:
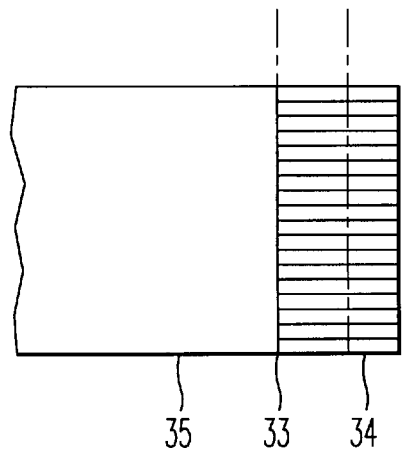

FIG. 3a shows a partial perspective view of a peripheral section of a display panel in accordance with a third embodiment of the present invention. FIG. 3b is a plan view of a bottom substrate of the display panel shown in FIG. 3a. As shown in FIG. 3a, the device has upper and lower dielectric substrates 30 and a liquid crystal (not shown) disposed between the dielectric substrates 30. The dielectric substrates 30 have a third groove 31 in a junction region on the top and bottom surfaces of the respective lower and upper dielectric substrates 30 with the liquid crystal (not shown) disposed therebetween. As shown in FIG. 3b, after adhesion of such upper and lower substrates, the sealing material tends to expand covering only an adhesion region 34; it barely expands beyond a boundary 33 into an LCD display section 35.

This sealing method is such that the sealing material used in sealing the liquid crystal is coated on a selected section 32 with hatching thereon, for rigid adhesion of both dielectric substrates 30 by known contact bonding techniques. In this case the volume V of the joined grooves 31 of both substrates 30 is given as:

$$V = a \times b \times c \times 2 \qquad (1)$$

where a is the depth of the groove 31, b is the width of the groove 31, and c is the length of the groove 31. Firstly, a selected volume of sealing material, which is equal to V, is coated on the surface of the hatched section 32. Then, one substrate 30 is pressed against an associated substrate 30 while applying a pressure thereto to ensure that the resulting adhesion region 34 is barely offset from the display section 35 beyond the boundary 33. Thereafter, the adhesion region 34 is selectively exposed to ultraviolet (UV) rays so that the adhesion region 34 alone is UV-hardened thus completing the sealing procedure.

It should be noted that the third groove 31 may alternatively be formed on either one of the upper and lower substrates; in such case, similar effects may be obtainable. Additionally, the sealing material may be thermally hardenable resin, such as epoxy.

Figure 4A:
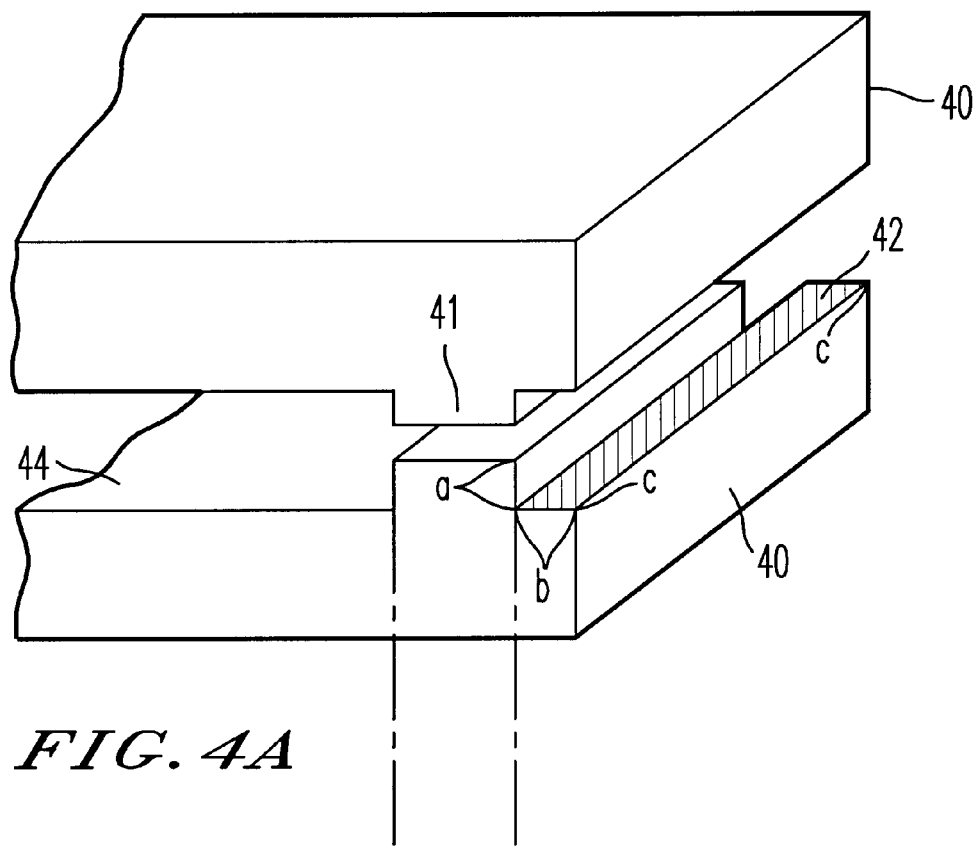
FIG. 4a is a partial perspective view of a substrate structure of a display panel in accordance with a fourth embodiment of the present invention.
Figure 4B:
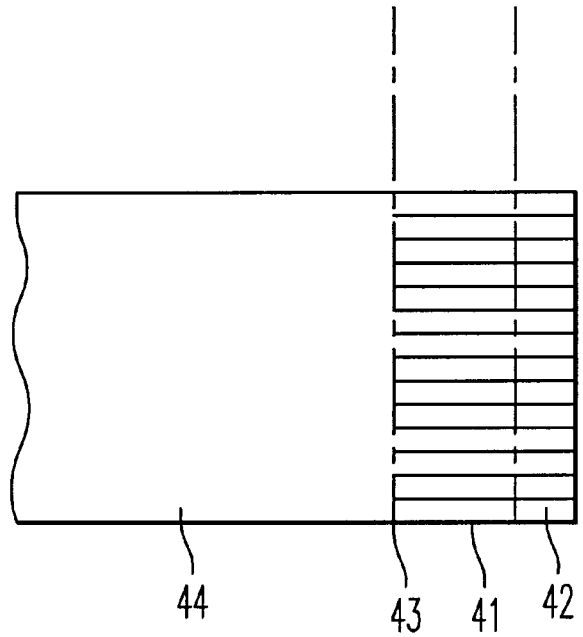

FIG. 4a is a partial perspective view of a substrate structure of a display panel in accordance with a fourth embodiment of the present invention. FIG. 4b is a corresponding plan view of the structure of FIG. 4a. As shown in FIG. 4a, the display panel comprises two dielectric substrates 40 and a liquid crystal (not shown). A ridge portion 41 is formed on the inner surface of each dielectric substrate 40 with the liquid crystal sandwiched between the substrates 40 so that each ridge 41 is spaced by a predefined distance from the end of a corresponding substrate 40. The ridges 41 have inside walls defining an internal space 44 which acts as a displayable region of the resulting LCD panel and has a display region boundary 43.

A sealing material used in sealing the liquid crystal is coated only on the surface of a selected hatched part 42, which is between the edges of the substrate 40 and the ridges 41, to thereby tightly adhere the dielectric substrates 41 to each other by contact bonding techniques. In this case the volume V of the hatched part 42 residing between the upper and lower substrates 40 is represented by:

$$V = a \times b \times c \times 2 \qquad (2)$$

where a is the height, b is the width, and c is the length. Accordingly, the sealing material coated on the hatched part 42 is substantially equal in volume to the value V.

With such a structure, it is possible to appropriately determine the seal width after substrate adhesion in such a way as to prevent the sealing material from leaking into the display area 44 beyond the display region boundary 43. Thus, the ridges 41 make the junction region width controllable.

The third and fourth embodiments of the present invention also offer an advantage of achievement of the cell gap controllability, in addition to the prescribed advantages of the first embodiment stated supra.

After the contact bonding process, the region into which the sealing material spreads is selectively exposed to UV rays. This results in the seal region alone being UV-hardened thus completing the seal structure. The sealing material as used herein may alternatively be a thermally hardenable resin including epoxy.

The ridges may be formed by many kinds of fabrication techniques. One example is that the ridges are fabricated simultaneously during the procedure of forming pixels on the array substrate. Another example is that the ridges are formed simultaneously while a color filter is formed above the opposed substrate.

Figure 5A:
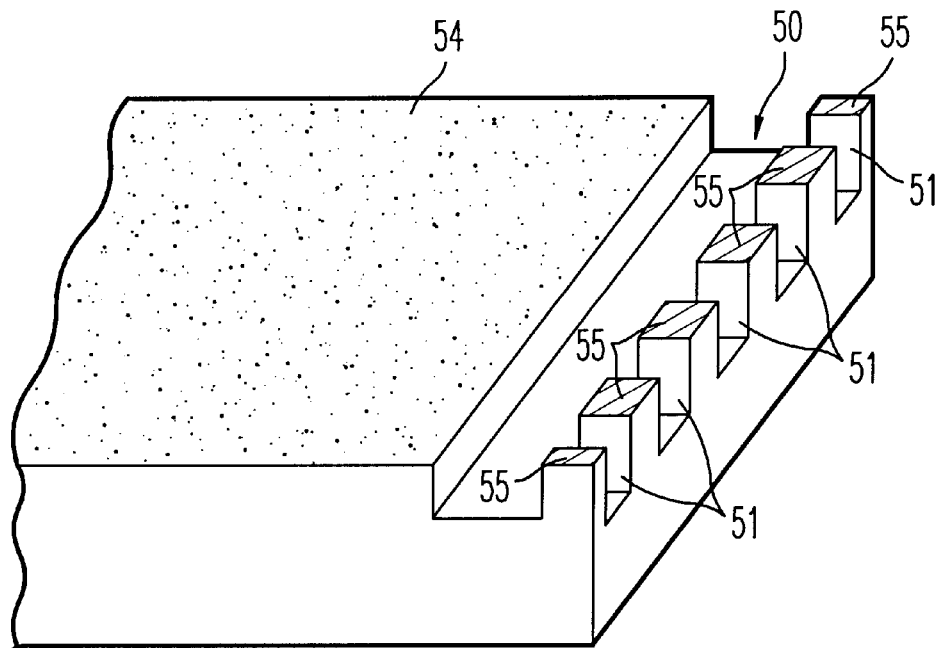
FIG. 5a is a partial perspective view of the edge section of a substrate used in a display device having a serpentine configuration provided at a ridge of an end of the substrate in accordance with a fifth embodiment of the present invention.
Figure 5B:
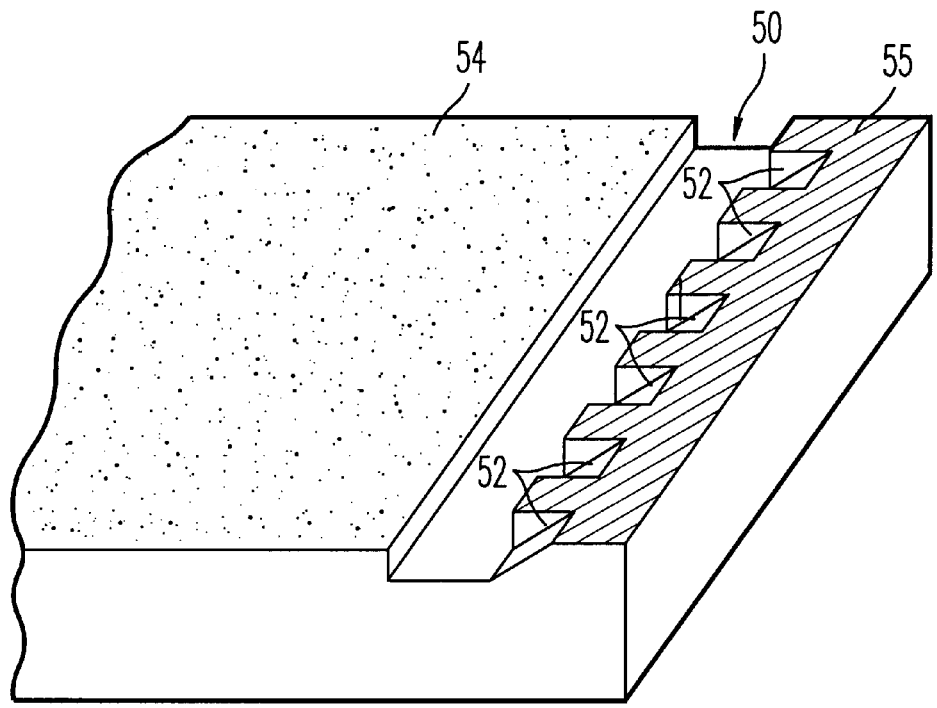
FIG. 5b depicts a partial perspective view of the edge of a substrate having a serpentine configuration provided within a groove at the end of the substrate in accordance with a sixth embodiment of the present invention.

FIG. 5a is a partial perspective view of the edge section of a substrate used in a display device having a serpentine configuration provided at a ridge of the end of the substrate in accordance with a fifth embodiment of the present invention. FIG. 5b depicts a partial perspective view of the edge of a substrate having a serpentine configuration provided within a groove at the end of the substrate in accordance with a sixth embodiment of the present invention. An LCD substrate has a top surface in which an elongated groove 50 is formed along an edge for elimination of excessive spreading of a sealing material into a displayable region 54. Small rectangular cutaway portions 51 are formed in an outer peripheral rim on the opposite side of the display region 54. In this example a sealing material is coated on hatched top surface segments 55 of the rim for adhesion by the segments 55 and the cutaway portions 51. During adhesion of the upper and lower substrates, the sealing material first attempts to spread into the cutaways 51 and then into the groove 50.

When the spreading rate of the sealing material is high, if the groove 50 were present alone with no cutaways 51, then part of the sealing material can reach the display region 54 faster than it spreads into the groove 50. The cutaways 51 suppress such unwanted spreading of the sealing material.

A sixth embodiment is shown in FIG. 5B, wherein small rectangular cutaway portions 52 are provided in one inner wall of the groove 50 next to the substrate rim at a sealing material coating section in a juncture region 55 having hatching. The spreading speed of a sealing material is controllable pursuant to the shape of the cutaways 52 also.

Figure 6:
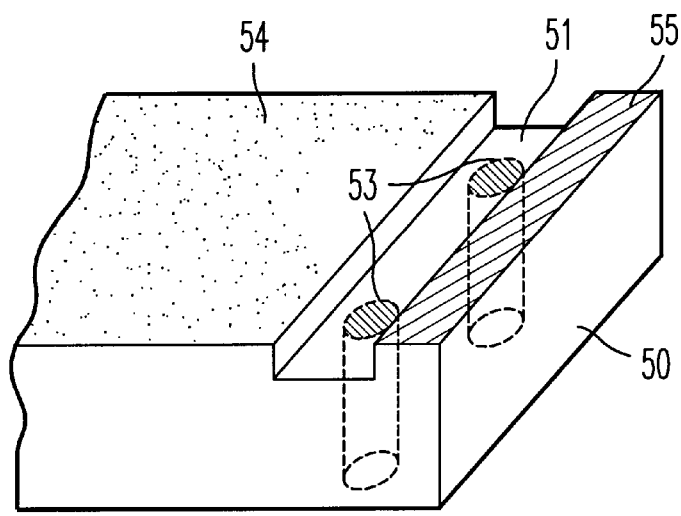
FIG. 6 is a perspective view of an LCD panel used in a display device including holes formed in a junction region in accordance with a seventh embodiment of the present invention.

FIG. 6 is a perspective view of an LCD panel used in a display device including holes formed in a junction region in accordance with a seventh embodiment of the present invention. The display device has vertically extending holes 53 in a groove 51.

Sealing material coated on a selected hatched surface 55 first flows into the groove 51; then, any extra sealing material is further pushed out or drained onto the substrate bottom surface through the holes 53 leading thereto. Here, the holes 53 may be formed by presently available techniques as far as these techniques ensure manufacturability of the holes 53 in a way such that the presence of the holes 53 does not affect the interior of the display region 54. Thus, the groove 51 and the holes 53 in the bonding region on the surface of the substrate 50 makes it possible to prevent the sealing material from spreading into the display region 54. In turn, this allows minimization of the spreading area of the sealing material, i.e. the bonding width, to thereby greatly reduce the width of any possible joint or "seam" line between neighboring LCD panels. It thus becomes possible to avoid or minimize observability of such seam line.

An eighth embodiment is such that a groove is formed on the bottom surface of each substrate in a selected region corresponding to the juncture region of an LCD panel. This arrangement is employed in order to prevent excessive spreading of extra sealing material components, which are drained or overflown out of the bonding surface at the substrate bottom-surface groove, onto the substrate bottom surface when neighboring LCD panels are adhered together. With such an arrangement, the spreading area of the sealing material or "seal width" may be minimized rendering a seam line invisible. It is also possible to suppress contaminants otherwise residing on the substrate. This is explained based on a practical example below.

Figure 7:
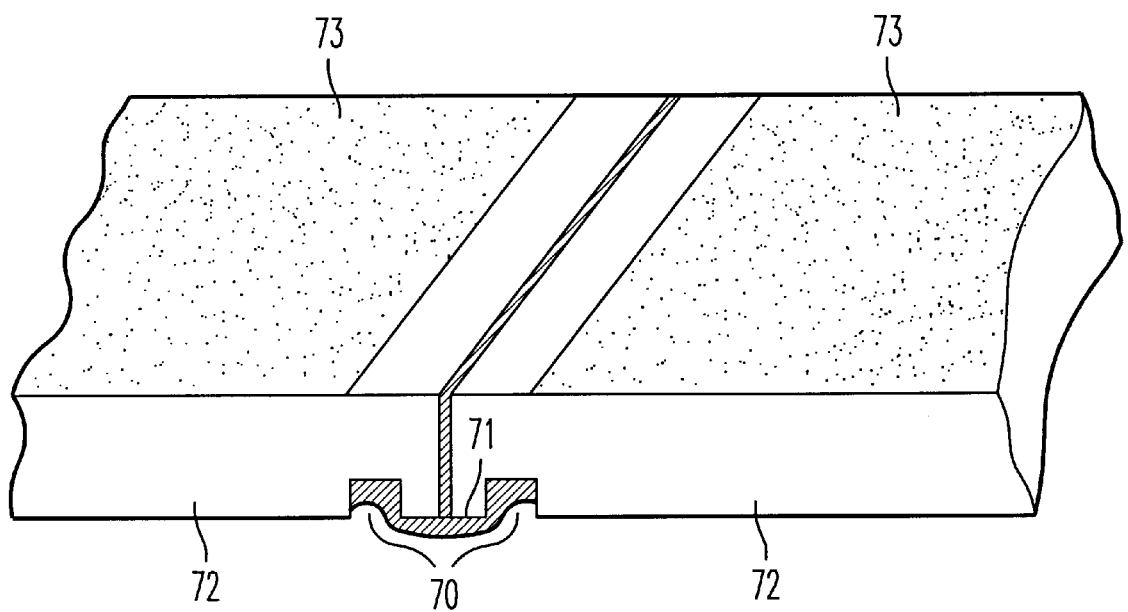
FIG. 7 is a partial perspective view of neighboring LCD substrates bonded for use in a display device in accordance with an eighth embodiment of the present invention.

FIG. 7 is a partial perspective view of neighboring LCD substrates bonded for use in a display device in accordance with an eighth embodiment of the present invention. Adjacent lower glass substrates 72 of neighboring LCD panels are bonded together at their opposing edges. Each substrate 72 has a display section 73 on which a liquid crystal layer (not shown) is to be formed, above which an upper substrate (not depicted) is provided constituting the intended LCD panel structure.

The glass substrate 72 has a groove 70 in a surface that is opposite to the surface used for sealing liquid crystal—typically, in the LCD panel bottom surface. When adhering the substrates 72 to each other, permeation of the sealing material 71 into the groove 70 may be prevented thus eliminating excessive spread thereof into the display region 73. Accordingly, in the case the sealing material 71 is made of an opaque material or a material different in refractive index from glasses by way of example, it becomes possible to avoid optical shielding due to such sealing material in the display region 73 adjacent to the junction region.

Note that it may also be possible to employ the structures of the first to seventh embodiments in combination.

A ninth embodiment is such that the electrode ends opposing each other are electrically connected together during adhesion of neighboring LCD panels with electrode ends at substrate edges provided in the junction region. This is important especially for use with those display panels which are incapable of directly connecting "internal" signal transmission lines and addressing lines thereon to "external" signal-line driver circuitry and/or address driver circuitry operatively associated therewith.

Figure 8:
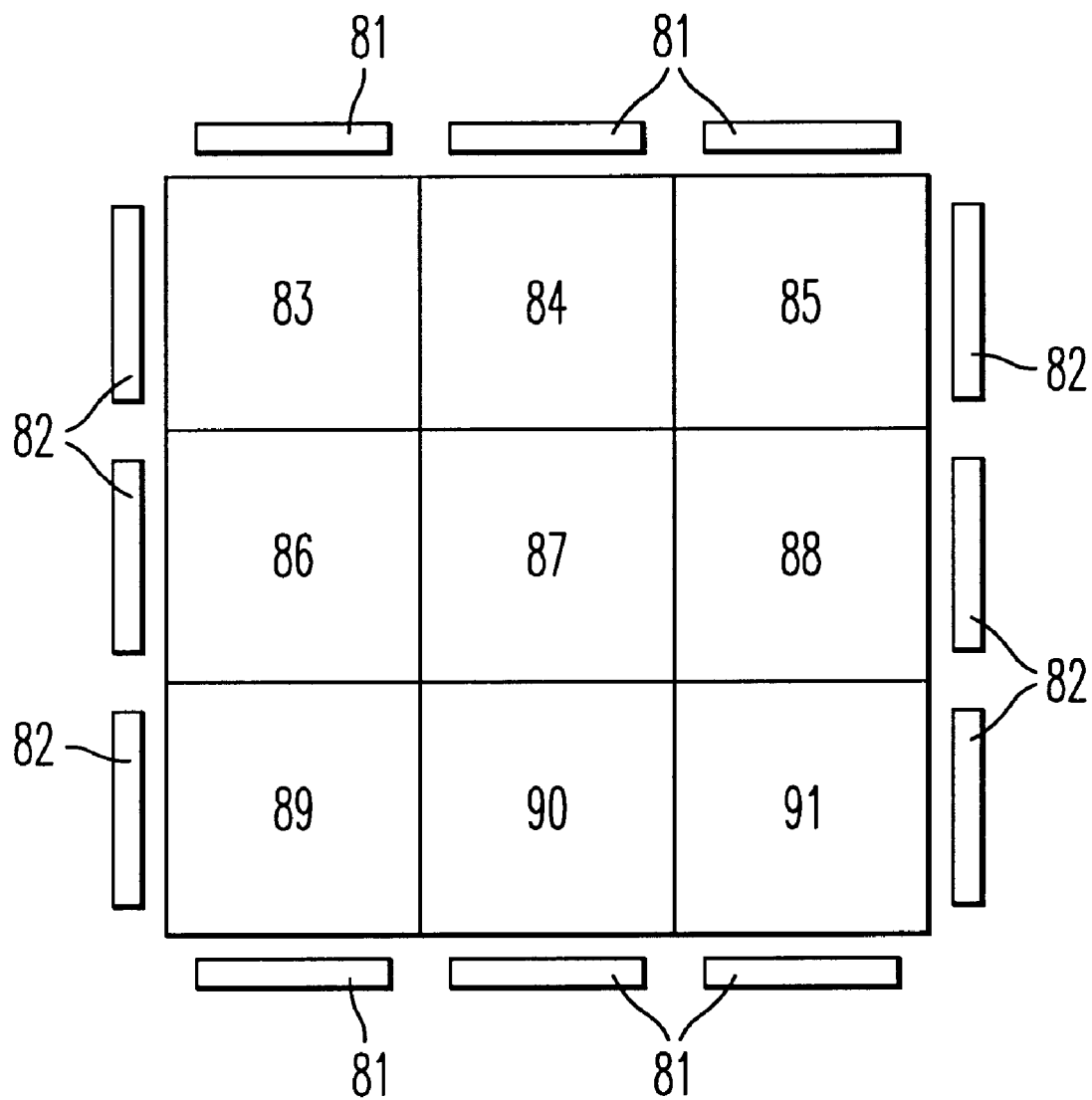
FIG. 8 is a plan view of a large-screen display device including a matrix of three rows and three columns of LCD panels bonded together with row and column drivers associated therewith in accordance with a ninth embodiment of the present invention.

FIG. 8 is a plan view of a large-screen display device including a matrix of three rows and three columns of LCD panels bonded together with row and column drivers associated therewith in accordance with a ninth embodiment of the present invention. Only nine panels are shown for clarity. More specifically, as shown in FIG. 8, a large-screen multipanel LCD device includes a matrix of rows and columns of LCD panels 83 to 91 operatively associated with peripheral signal line driver circuits 81 and address line driver circuits 82 disposed around the periphery of the LCD panel matrix. Of those panels 83–91, the "middle" row of LCD panels 86, 87, 88 cannot be directly connected to the signal line drivers 81 whereas the middle column of panels 84, 87, 90 cannot be directly coupled to address line drivers 82. The "central" panel 87 are directly connectable to none of the signal line drivers 81 and address line drivers 82. The ninth embodiment provides connectivity of such panels to the peripheral drivers.

In this example it is possible to provide electrical interconnections of signal lines and address lines among the LCD panels 83–91 to the signal line drivers 81 and the address line drivers 82 at the periphery of multipanel matrix. Practically, an anisotropic conductive seal material is used for connection to electrode pads which are contact sections on opposing dielectric substrates to thereby electrically connect neighboring ones of LCD panels 83–91.

With regard to the "corner" LCD panels 83, 85, 89, 91 of the multipanel matrix shown in FIG. 8, these are directly connectable to any one of the signal line drivers 81 and address line drivers 82 so that a need does not exist for supplying signals through neighboring panels. The upper and lower panels 84, 90 of the intermediate column are directly connectable to signal line drivers 81 only, while the right and left panels 88, 86 of the intermediate row are directly connectable to address line drivers 82 only. The central panel 87 is directly connectable to none of the drivers 81, 82. These LCD panels receive signals from drivers 81, 82 through their neighboring panels.

Figure 9A:
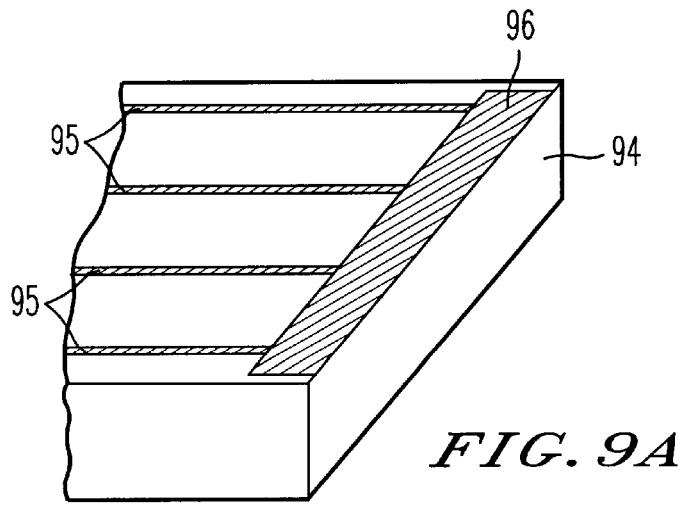
FIGS. 9a and 9b are partial perspective views of some of the major steps in the manufacture of a signal line side substrate of a first type in accordance with the ninth embodiment of the present invention.
Figure 9B:
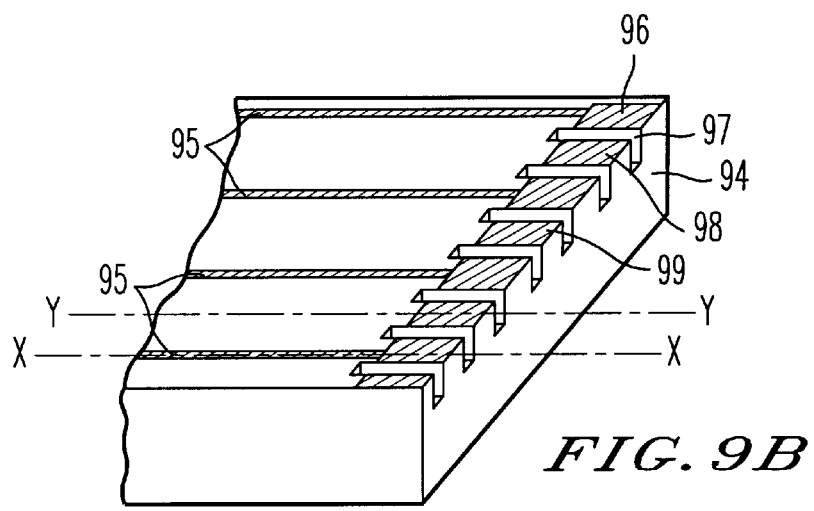

FIGS. 9a and 9b are partial perspective views of some of the major steps in the manufacture of a signal line side substrate of a first type in accordance with the ninth embodiment of the present invention. Each LCD panel includes a lamination of two substrates with a "thin" space defined therebetween in which a chosen liquid crystal is sealed. One of these substrates has thereon signal lines and address lines (collectively referred to as signal leads 95 hereinafter) for supplying electrical signals used in visually indicating desired images. The remaining substrate has a conductive layer covering the entire surface thereof, which layer is held at a preselected constant voltage potential and thus acts as an "opposed" electrode. Accordingly, it is necessary to electrically interconnect the signal leads and common electrode of each LCD panel to corresponding leads and electrodes of its neighboring panel or panels.

The LCD panel of this embodiment includes a substrate 94 with the signal leads 95 formed as shown in FIG. 9a, wherein the parallel elongate leads 95 are formed extending up to the edge of the substrate 94. A metal film 96 is formed on a "margin" area at the outer periphery of the substrate 94, and acts as an electrode for electrical connection. In this case the electrode film 96 may be formed by currently available fabrication techniques—preferably, using deposition methods and sputtering methods.

Then, as shown in FIG. 9b, thin rectangular cutaway portions 97 are formed using dicer machines in a selected peripheral area containing the electrode 96 at appropriate intervals, which are determinable depending on the distance or "layout pitch" of the signal leads 95. This results in formation of a linear array of spaced-apart conductive "islands" including a plurality of electrode pads 98 and a plurality of relay pads 99. The dicing process permits simultaneous formation of the electrode pads 98, the relay pads 99, and the separator cutaways 97 in the junction region of the substrate 94. In this way, a terminate end section of the first type may be fabricated for the substrate 94 with the signal leads 95.

Figure 10:
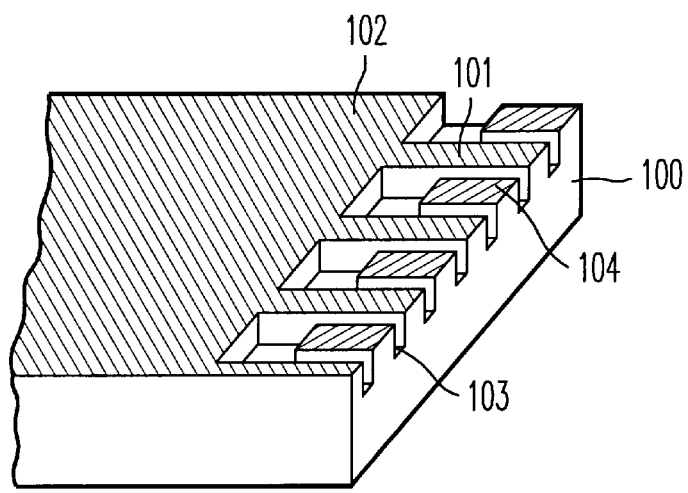
FIG. 10 is a partial perspective view of a common electrode side substrate of a first type in accordance with the ninth embodiment of the present invention.

FIG. 10 is a partial perspective view of a common electrode side substrate of a first type in accordance with the ninth embodiment of the present invention. On the other hand, a substrate 100 making a pair with the lead-formed substrate 97 of FIG. 9B is shown in FIG. 10, wherein a common electrode 102 typically made of a transparent conductive film is formed covering the overall surface of the substrate 100. The substrate 100 has a junction region relative to its neighboring LCD panel, in which an electrode film is formed in a way similar to that shown in FIG. 9A. Then, etching is done forming an array of concave portions 103 each of which generally resembles the letter "U" in planar shape as shown in FIG. 10. Simultaneously, a plurality of-electrode pads 101 and a plurality of relay pads 104 are formed therein. The common electrodes 102 and the pads 101 are electrically conducted to each other, while the relay pads 104 are electrically independent or "floating." In this way, a terminate end section of the second type is fabricatable for the substrate 100 with the common electrode 102.

Figure 11:
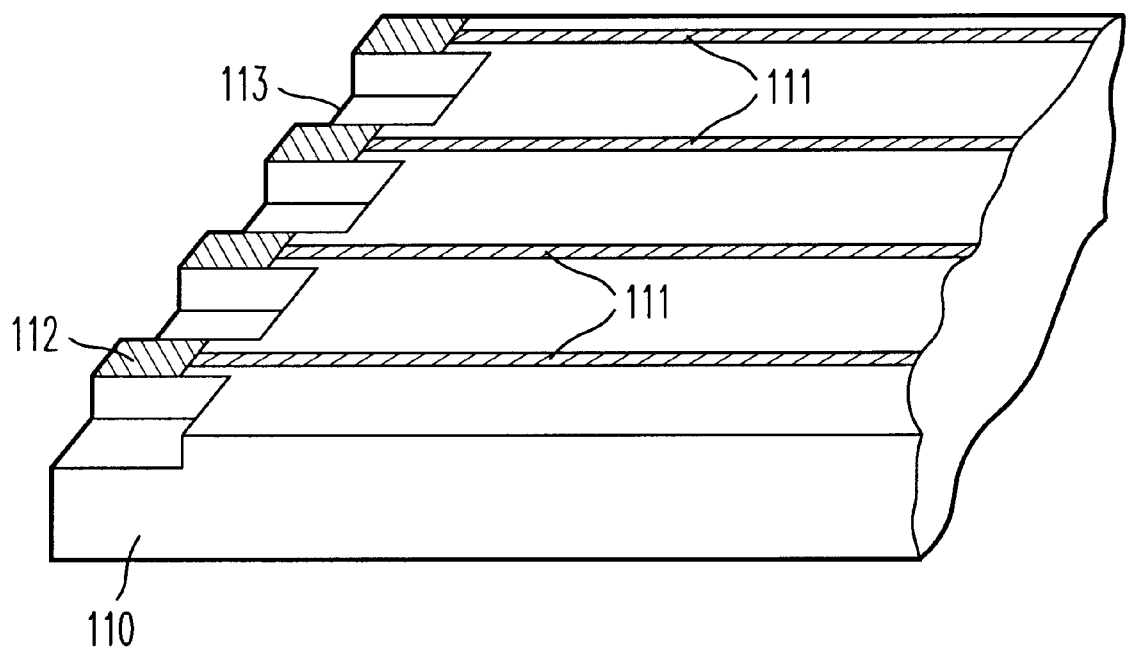
FIG. 11 is a partial perspective view of a signal line side substrate of a second type in accordance with the ninth embodiment of the present invention.

FIG. 11 is a partial perspective view of a signal line side substrate of a second type in accordance with the ninth embodiment of the present invention. As shown in FIG. 11, a substrate 110 with parallel signal leads 111 has thereon corresponding electrode sections 112 and corresponding concave portions 113 which may be formed in a way similar to that in the previous case, thereby providing a lead-formed substrate end section of the second type.

Figure 12:
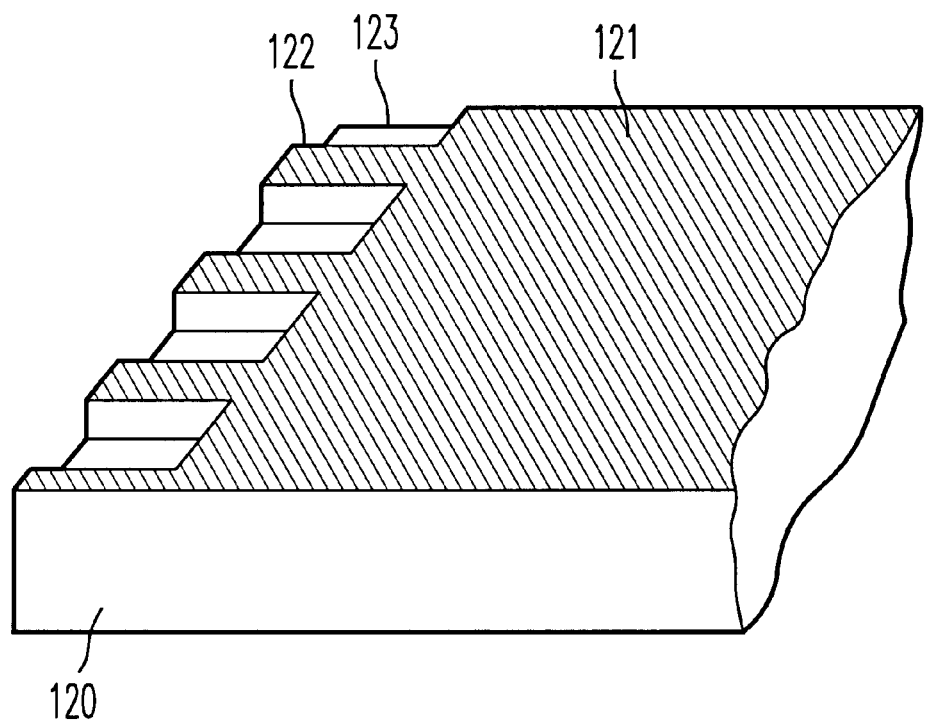
FIG. 12 is a partial perspective view of a common electrode side substrate of a second type in accordance with the ninth embodiment of the present invention.

FIG. 12 is a partial perspective view of a common electrode side substrate of a second type in accordance with the ninth embodiment of the present invention. As shown in FIG. 12, a substrate 120 has a common electrode 121 on an entire surface, electrode pads 122, and concave portions 123, which are formed to provide an opposed-electrode substrate end section of the second type.

Figure 13A:
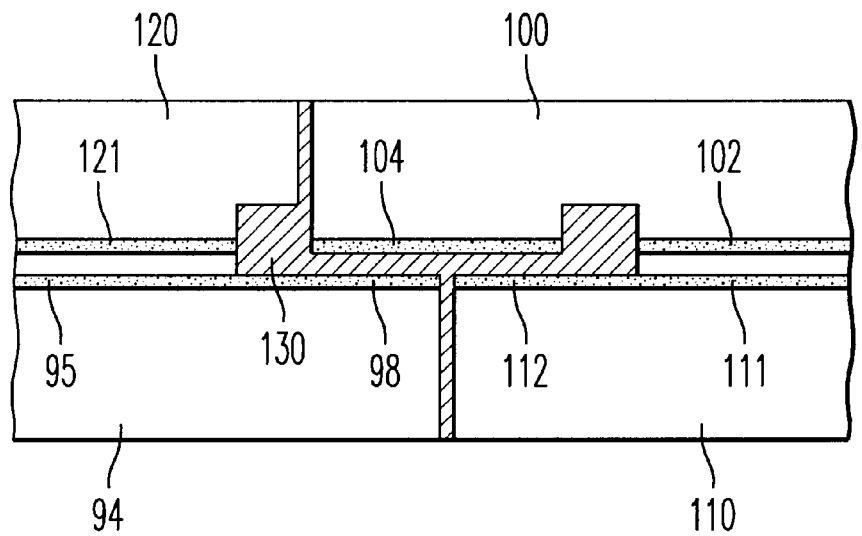
FIG. 13a illustrates a cross-sectional view along a line X—X in FIG. 9b of bonded LCD panels in accordance with the ninth embodiment of the present invention.
Figure 13B:
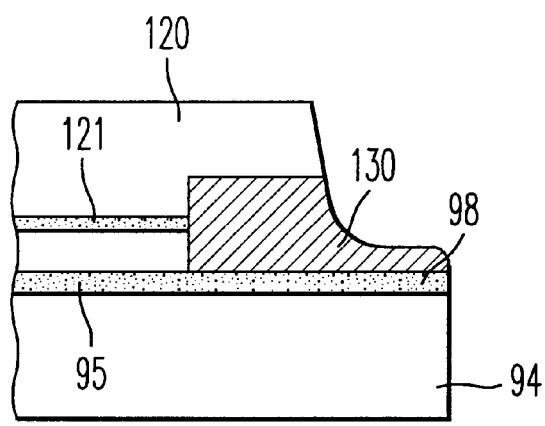
FIG. 13b shows a cross-sectional view along the line X—X in FIG. 9b of a lamination of the signal line side substrate of the first type and the common electrode side substrate of the second type.
Figure 13C:
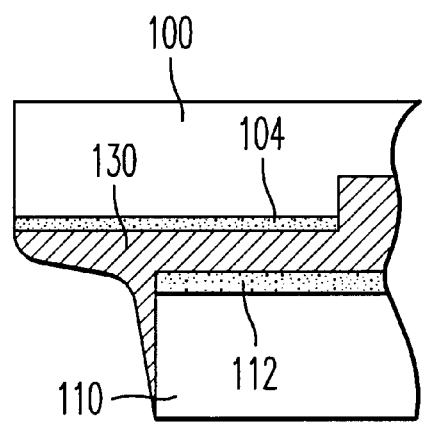
FIG. 13c is a cross-sectional view along the line X—X in FIG. 9b of a lamination of the signal line substrate of the second type and the common electrode substrate of the first type.

FIG. 13a illustrates a cross-sectional view along a line X—X in FIG. 9b of bonded LCD panels in accordance with the ninth embodiment of the present invention. FIG. 13b shows a cross-sectional view along the line X—X in FIG. 9b of a lamination of the signal line side substrate of the first type and the common electrode side substrate of the second type. FIG. 13c, is a cross-sectional view along the line X—X in FIG. 9b of a lamination of the signal line substrate of the second type and the common electrode substrate of the first type.

Figure 14A:
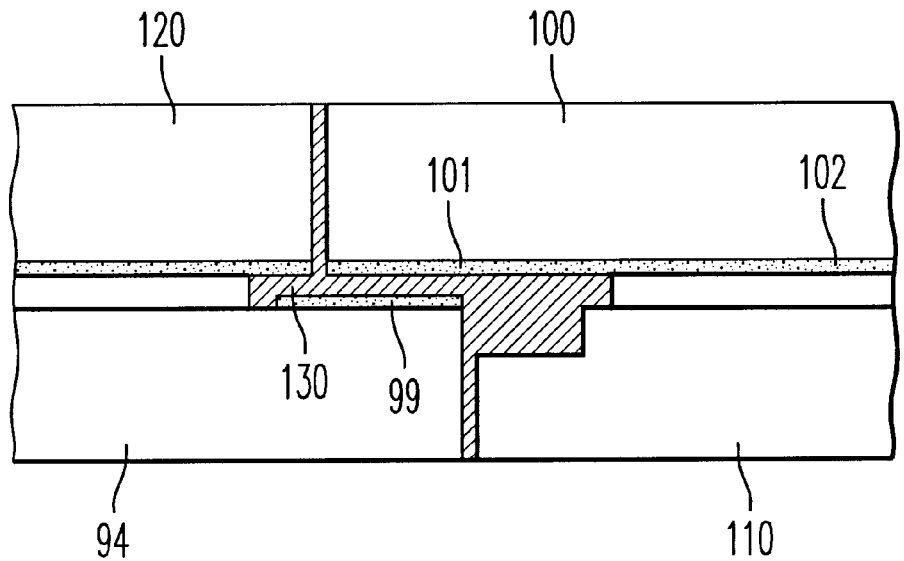
FIG. 14a depicts a cross-sectional view of a structure along a line Y—Y in FIG. 9b of bonded LCD panels in accordance with the ninth embodiment of the present invention.
Figure 14B:
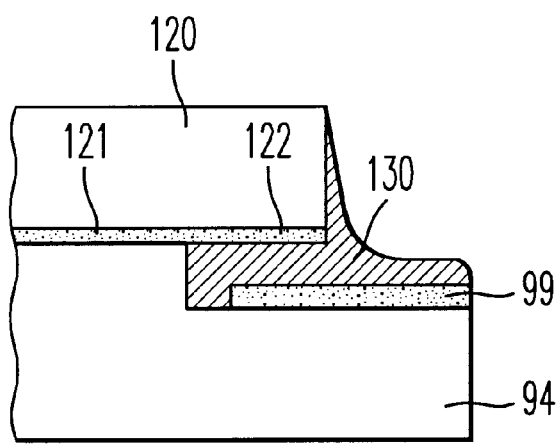
FIG. 14b shows a cross-sectional view along the line Y—Y in FIG. 9b of a lamination of the signal line substrate of the first type and the common electrode substrate of the second type.
Figure 14C:
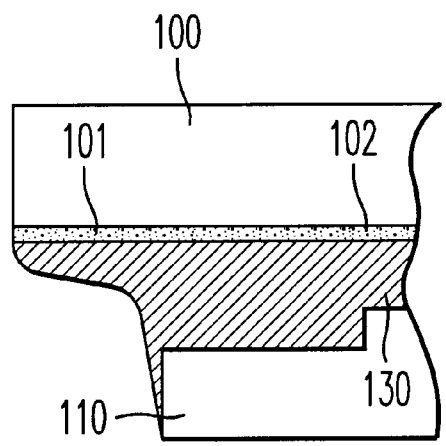
FIG. 14c is a cross-sectional view along the line Y—Y in FIG. 9b of a lamination of the signal line substrate of the second type and the common electrode substrate of the first type.

FIG. 14a depicts a cross-sectional view of a structure along a line Y—Y in FIG. 9b of bonded LCD panels in accordance with the ninth embodiment of the present invention. FIG. 14b shows a cross-sectional view along the line Y—Y in FIG. 9b of a lamination of the signal line substrate of the first type and the common electrode substrate of the second type. FIG. 14c is a cross-sectional view along the line Y—Y in FIG. 9b of a lamination of the signal line substrate of the second type and the common electrode substrate of the first type.

Next, as shown in FIGS. 13a and 14a, respective resultant substrates 94, 100, 110, 120 of FIGS. 9b, 10–12 are disposed with the upper and lower edges slightly offset along the surface. Each substrate is rigidly adhered to its neighboring substrate using an anisotropic conductive sealing material 130. Here, FIGS. 13a–13c depict cross sections taken along line X—X in FIG. 9b—i.e. along the length of one signal lead; FIGS. 14a–14c show cross sections along line Y—Y of FIG. 9b, which corresponds to certain substrate parts with no signal leads.

The anisotropic conductive seal 130 is a material that inherently exhibits conductivity in a certain direction in which an external force is applied thereto.

First, as shown in FIG. 14c, the opposite electrode-side substrate 100 and its associated signal lead-side substrate 110 are laminated and bonded together while vertically applying a pressure thereto. This permits electrical connection between the repeater electrode pads 104 on the substrate 100 and the electrode pads 112 on the substrate 110 as shown in FIG. 13c.

On the other hand, as shown in FIG. 13b, the signal lead substrate 94 of the first type and the common electrode substrate 120 of the second type are laminated and bonded together with a vertical pressure applied thereto. This results in electrical connection between the relay pads 99 on the substrate 94 and the electrode pads 122 on the substrate 120 as shown in FIG. 14b.

Further, as shown in FIG. 13a, the LCD panel edge of FIG. 13b and that of FIG. 13c are contact-bonded together with a vertical pressure applied. This enables electrical connection between the relay pads 104 on the common electrode substrate 100 and the electrode pads 98 on the signal lead substrate 94. In turn, this makes it possible to connect the electrode pads 98 on the substrate 94 of one LCD panel to corresponding electrode pads 112 on the substrate 110 of another LCD panel next to the former panel through the relay pads 104 on the substrate 100. Thus, the signal leads 95 on the substrate 94 are connected to the signal leads 111 on the substrate 110.

Simultaneously, as shown in FIG. 14a, the LCD panel edge of FIG. 14b and that of FIG. 14c are adhered together with a vertical pressure applied thereto. This enables electrical connection between the relay pads 99 on the signal lead substrate 94 and the electrode pads 101 on the common electrode substrate 100. This in turn makes it possible to connect the electrode pads 122 on the substrate 120 of one LCD panel to corresponding electrode pads 101 on the substrate 100 of another LCD panel neighboring to the former panel through the relay pads 99 on the substrate 94. It is thus possible to connect between the common electrode 121 on the substrate 120 and the common electrode 102 on the substrate 100.

The foregoing alternate concave/projection configuration and/or gap array may be fabricated and processed for after-treatment by means of currently available techniques as far as these techniques guarantee that the resultant junction lines or "seam" lines between adjacent ones of the LCD panels bonded together remain invisible or less observable to human eyes.

In this embodiment any required voltages are supplied to those of the LCD panels 83–91 shown in FIG. 8 which have their "internal" signal/address lines that are inherently incapable of being directly connected to the signal line drivers 81 or address line drivers 82 or both, in a way such that the voltages required are fed thereto through some neighboring LCD panels. This can be done because electrical interconnections of signal/address lines are available between any adjacent one of LCD panels bonded. Without this feature of the present invention, LCD panels for organization into a large-screen multipanel LCD device are limited in bondable number to four (4)—in this case such panels are directly coupled to signal/address-line driver circuits. Use of the aforesaid structural concept of the present invention alone enables such combined LCD panels to increase in number beyond five (5) while at the same time providing reliable electrical connections with the peripheral driver circuits, which may in turn permit the resulting "tiled" LCD device to further increase in screen size.

Figure 15A:
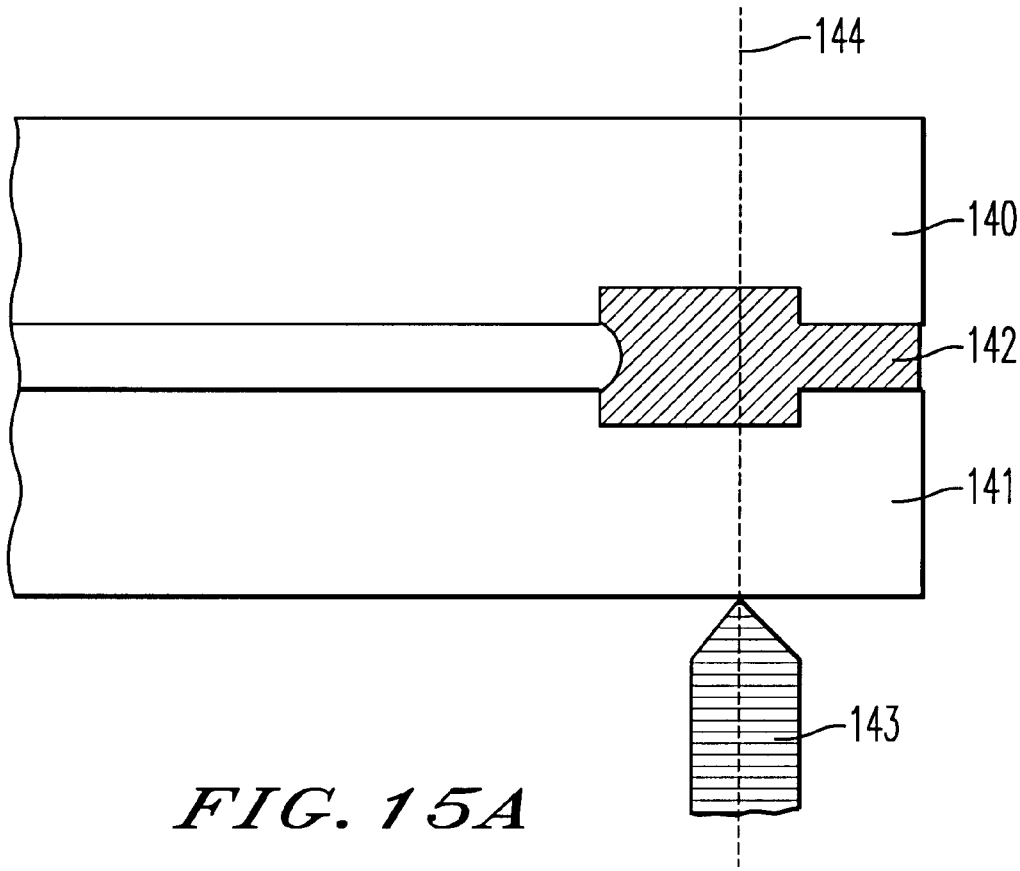
FIGS. 15a–15b illustrate, in cross-sectional view, two major steps in the cut-away process using a cutter machine at a juncture line section of upper and lower substrates bonded together in accordance with a tenth embodiment of the present invention.
Figure 15B:
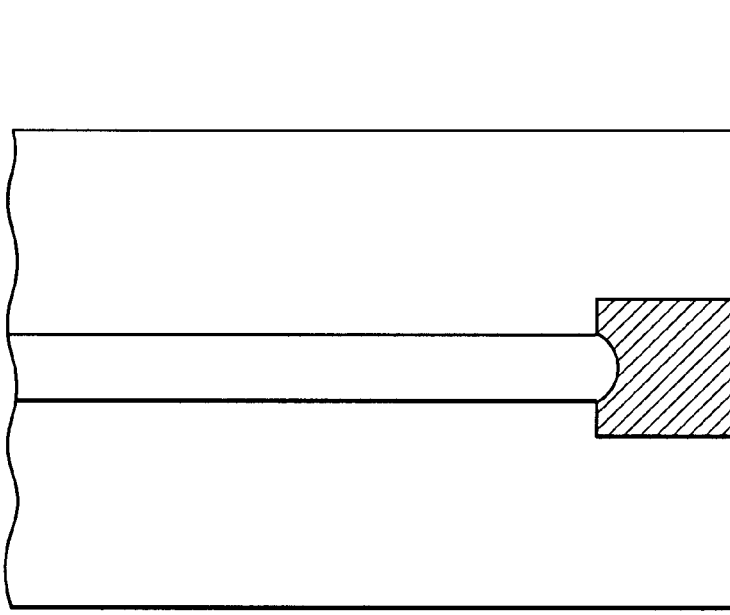

FIGS. 15a–15b illustrate, in cross-sectional view, two major steps in the cut-away process using a cutter machine at a juncture line section of upper and lower substrates bonded together in accordance with a tenth embodiment of the present invention. A tenth embodiment shown in FIGS. 15a–15b employs a scheme for linearly cutting and reshaping the edge of an LCD panel for use in fabricating a large-screen multipanel LCD device by a procedure including the steps of bonding upper and lower substrates 140, 141 using a chosen sealing material 142, and then using a dicer 143 to cut a selected peripheral edge portion at a junction or "seam" line boundary section 144 away from the resultant lamination as shown in FIG. 15a. Whereby, as shown in FIG. 15b, an LCD panel with reduced seam-line width may be fabricated facilitating junction or adhesion of neighboring LCD panels.

FIGS. 16a–16d illustrate in cross-sectional view some of the major steps in the cutting process of a display device in accordance with an eleventh embodiment of the present invention. An eleventh embodiment is such that when an LCD substrate is cut using cutter machines including a dicer, the dicer's movement is specifically controlled in a way such that the vertical movement is rendered discontinuous in units of certain depths to thereby provide a cut face with a generally down-sloped but precisely stair-step-like profile. This cut-face profile may include at least two stair steps.

Provision of such stair-step-like cutaway surface configuration at the substrate edge section may greatly reduce the risk of burr occurrence, which in turn enables execution of successful substrate-edge cutting process. This may minimize the area of non-displayable regions thus rendering seam lines invisible on the resulting "tiled" display screen of a multipanel LCD device.

Figure 16A:
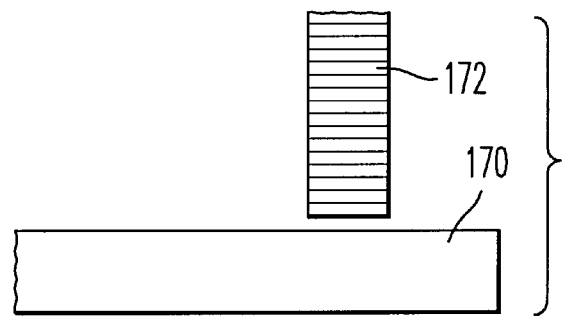
FIGS. 16a–16e illustrate in cross-sectional view some of the major steps in the cutting process of a display device in accordance with an eleventh embodiment of the present invention.
Figure 16B:
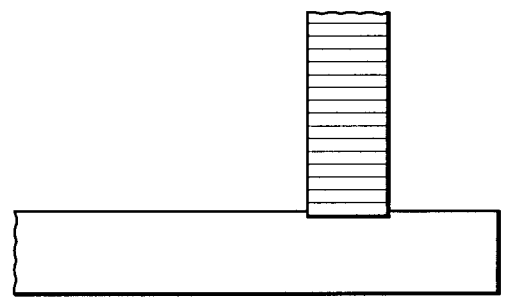
Figure 16C:
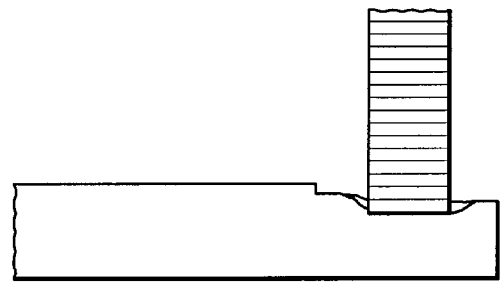
Figure 16D:
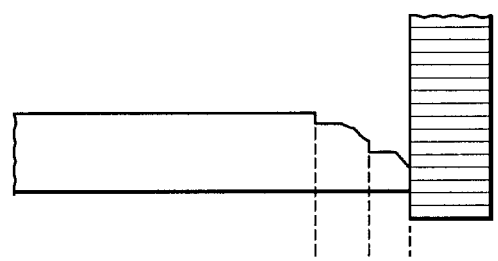
Figure 16E:
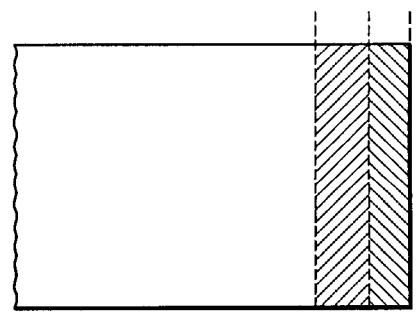

For details of the substrate cutting method, refer first to FIG. 16a. As shown, a dielectric substrate 170 for liquid crystal sealing is prepared and placed on a support table (not shown) for a cutting process using a dicer 172. As shown in FIG. 16b, the dicer 172 is urged down and into direct contact with the top surface of the substrate 170 at a preselected location thereon. The dicer 172 effectuates "shallow" surface cutting—typically, by a depth of cut of about 10 microns ($\mu$m). Then, at the second cutting step of FIG. 16c, while the dicer 172 is urged to move laterally to approach the substrate edge by a predefined along-the-surface distance, the dicer 172 is simultaneously urged further downward and "sink" from the substrate surface for execution of deep cutting, which results in formation of a "variable" or step-like cross section in a resultant edge surface. Next, at the third step of FIG. 16d, complete cutting of the substrate 170 is done by the dicer 172. Those skilled in the art will appreciate that the dimension of any residual cutting fin or burr in most cases is largely dependent on the degree of cutting depth (preset values of the dicer's depth of cut): the less the cut depth, the less the burr size. This has also been confirmed through experimentation. Accordingly, appropriate adjustment of the substrate and the cutting depth may greatly reduce or minimize the width of burr. Although in the illustrative embodiment two-step "preliminary" cutting procedure is shown, it is permissible to perform a single-step or three-step precutting process.

Figure 17A:
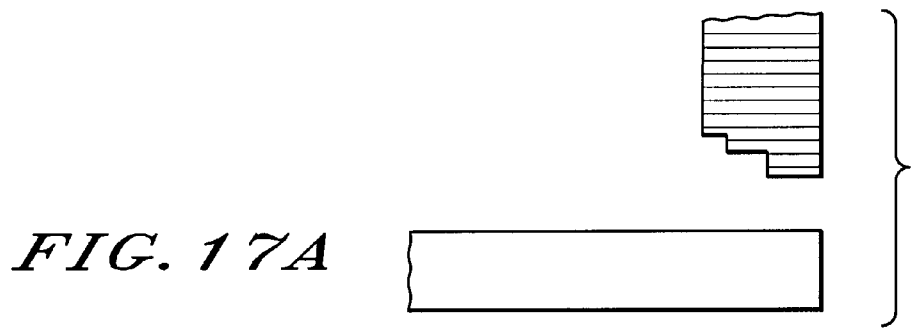
FIGS. 17a–17b illustrate in cross-sectional view some of the major steps in the cutaway process of a display device in accordance with a modification of the eleventh embodiment.
Figure 17B:
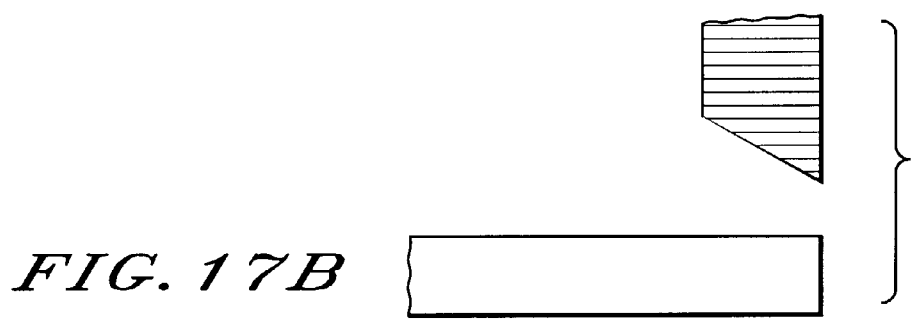

FIGS. 17a–17b illustrate in cross-sectional view some of the major steps in the cutaway process of a display device in accordance with a modification of the eleventh embodiment. While it has been described in the embodiment that the substrate is cut through a plurality of successive cutting steps, substantially the same effect are also obtainable by modifying the dicer's tip end shape as shown in FIGS.

17a–17b. A dicer structure shown in FIG. 17a has a "blade" having a stair-step-like profile, while a dicer of FIG. 17b includes a tip end having a continuously sloped or slant surface. In any one of the cases also, cutting is done while letting the dicer gradually move toward the edge side of a substrate, thereby to enable enhancement of the intended burr width reduction effect. Simultaneously, it is possible to smoothen the cut face of the substrate.

Figure 18A:
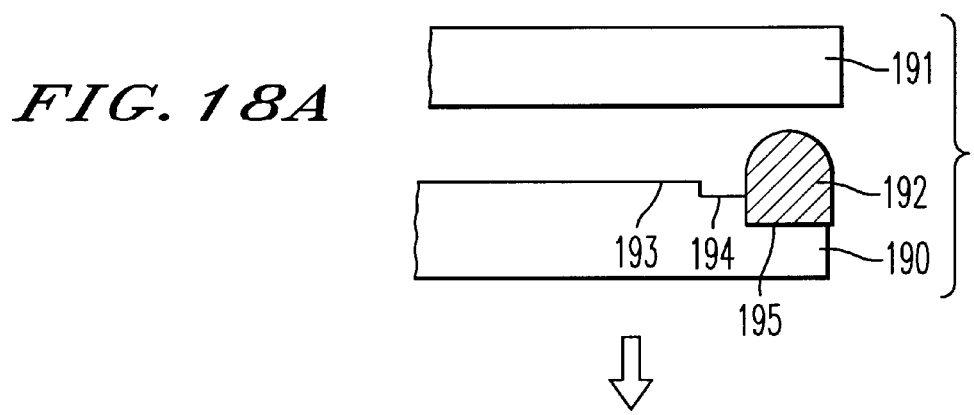
FIGS. 18a–18b show in cross-sectional view a substrate as processed using a seal-width controller in accordance with a twelfth embodiment of the present invention.
Figure 18B:
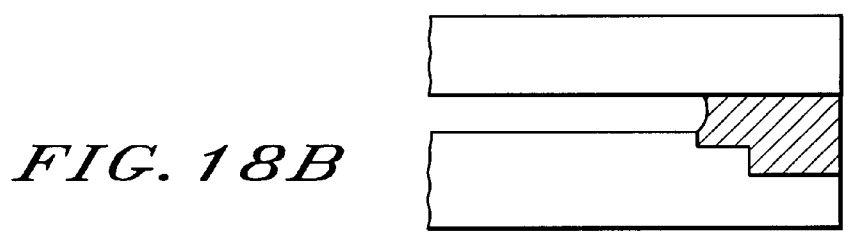
Figure 19A:
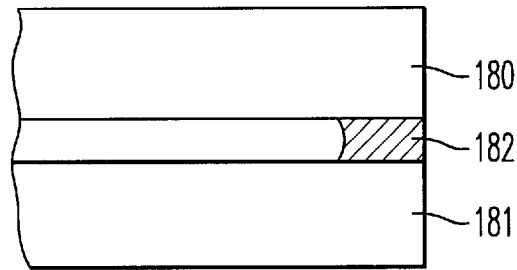
FIGS. 19a–19d are a cross-sectional view of a bonded structure, a top plan view of a bonded structure, and top and side plan views of a panel assembly of a prior art flat-surface display device.
Figure 19B:
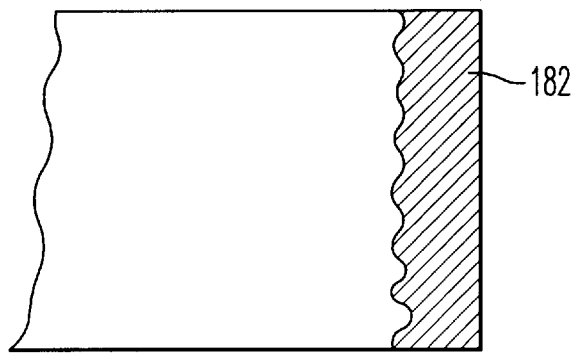
Figure 19C:
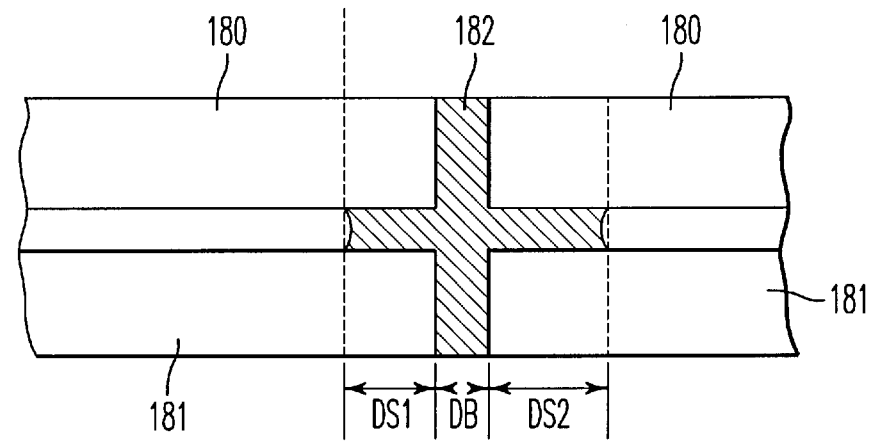
Figure 19D:
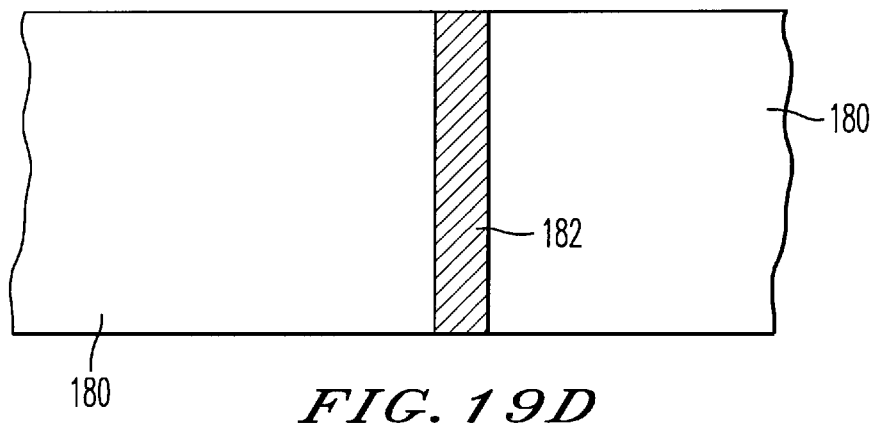
Figure 20A:
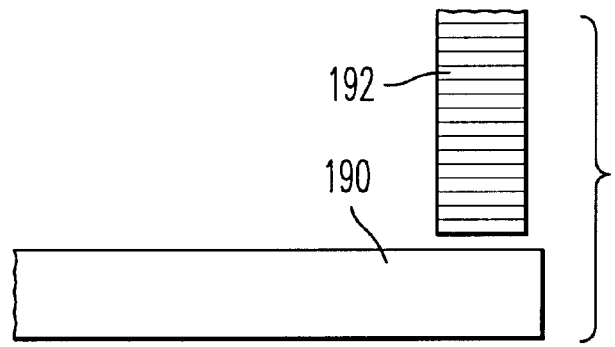
FIGS. 20a–20c are a side view of a substrate before cutting, side view during cutting of the substrate and a top plan view of the substrate, respectively, illustrating an irregularity of the expansion of the sealing material at a cut edge of the substrate processed using a prior art cutter machine.
Figure 20B:
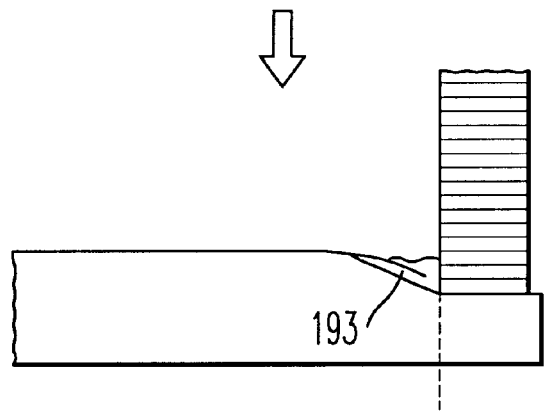
Figure 20C:
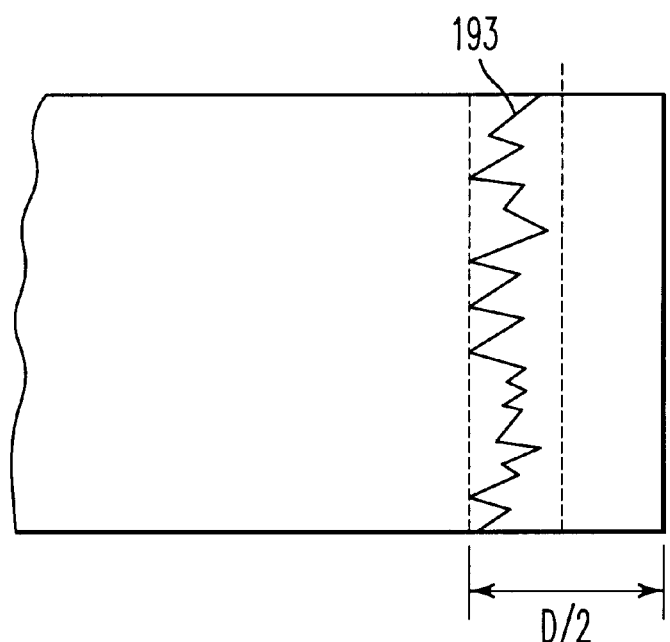

FIGS. 18a–18b show in cross-sectional view a substrate as processed using a seal-width controller in accordance with a twelfth embodiment of the present invention. This example is directed to limiting the width of a sealing material 192 by utilizing a stair-step-like profile structure to let the seal 192 be coated on selected part within the step-like structure.

As shown in FIG. 18a, a pair of substrates 190, 191 are laminated above each other with a liquid crystal layer (not shown) sandwiched therebetween. The lower substrate 190 has a top surface 193 with a peripheral area in which a stair-step like cutaway section is formed. The cutaway section includes a first "shallow" step portion 194 and a second "deeper" step portion 195. The sealing material 192 is selectively coated covering the second step portion 195 only; then, the substrate 190 is tightly contacted with the overlying substrate 191. This results in the "packed" sealing material 192 being controlled in expandability so that the sealing material 192 is prevented from attempting to overflow or spread into the display region beyond the first step portion 194. This enables successful control of burr creation and expansion of the sealing material 192.

Accordingly, this embodiment is capable of greatly reducing the area of junction or "seam" regions because the formation of the stair step-like cut face configuration using the dicer may also achieve increased controllability of the seal width.

While the present invention has been particularly shown and described with reference to some preferred embodiments thereof, it will be understood by those skilled in the art that the invention should not exclusively be limited thereto in regard to the multipanel adhesion-assembly structures having either surface configurations or gaps in junction regions. Further, the surface configurations or stair-step-like structures are modifiable in location so that such are formed on the signal line-side substrate, or the common electrode-side substrate, or both. It is also noted that the foregoing and other changes in form and details may be made therein without departing from the spirit and scope of the invention.

The present invention is drawn to a large-screen flat-surface multipanel LCD device with a plurality of rows and columns of separate display panels organized into a 2D matrix, each panel is sealed by a chosen sealing material, wherein a surface configuration of predefined profile or a gap with a stair-step-like cross section is provided in the junction region between neighboring display panels. This may advantageously control the expandability of the sealing material causing non-displayable regions to decrease in area on the resulting screen of the "tiled" display device.

What is claimed is:

1. A liquid crystal multipanel display comprising:
   a first board having first electrode pads, first signal leads connected to the first electrode pads, first isolated relay pads, and first concave portions between the first electrode pads and the first relay pads on a periphery of the first board;
   a second board having second electrode pads, a first common electrode connected to the second electrode pads, second isolated relay pads, and second concave portions between the second electrode pads and the second relay pads on a periphery of the second board;
   a third board having third electrode pads, third signal leads connected to the third electrode pads, and third concave portions between respective of the third electrode pads on a periphery of the third board;
   a fourth board having fourth electrode pads, a second common electrode connected to the fourth electrode pads, and fourth concave portions between the fourth electrode pads on a periphery of the fourth board;
   a first liquid crystal layer between the first board and the second board;
   a second liquid crystal layer between the third board and the fourth board; and
   an anisotropic conductive seal that seals the first board, the second board, the third board, and the fourth board, the anisotropic conductive seal electrically connecting the first electrode pads and the third electrode pads via the second relay pads and electrically connecting the second electrode pads and the fourth electrode pads via the first relay pads.

2. A liquid crystal multipanel display comprising:
   a first lower board having an upper surface and a lower surface opposite the upper surface, the lower surface defining a first groove along a periphery of the lower surface of the first lower board;
   a second lower board having an upper surface and a lower surface opposite the upper surface, the lower surface defining a second groove along a periphery of the lower surface of the second lower board;
   a first liquid crystal layer on the upper surface of the first lower board;
   a second liquid crystal layer on the upper surface of the second lower board;
   a first upper board on the first liquid crystal layer; and
   a second upper board on the second liquid crystal layer;
   wherein said first lower board and the second lower board are sealed to each other along an edge of the first lower board and an edge of the second lower board, the edge of the first lower board being located between the upper and lower surfaces of the first lower board, the edge of the second lower board being located between the upper and lower surfaces of the second lower board.

3. A liquid crystal multipanel display comprising:
   a first lower board having an edge surface defining a first groove;
   a second lower board having an edge surface defining a second groove, the edge surface of the second lower board being adjacent to the edge surface of the first lower board;
   a first liquid crystal layer on an upper surface of the first lower board;
   a second liquid crystal layer on an upper surface of the second lower board;
   a first upper board on the first liquid crystal layer; and
   a second upper board on the second liquid crystal layer;
   wherein the first lower board and the second lower board are sealed to one another along the edge surface of the first lower board and the edge surface of the second lower board, and the first upper board is sealed to the second upper board above the edge surface of the first lower board and the edge surface of the second lower board.

4. A liquid crystal multipanel display according to claim 3, wherein the first groove and the second groove engage one another.

5. A liquid crystal multipanel display comprising:

a first lower board having an edge surface defining first plural notches;

a second lower board having an edge surface defining second plural notches adjacent the first plural notches of the first lower board, the edge surface of the second lower board facing the edge surface of the first lower board;

a first liquid crystal layer on an upper surface of the first lower board;

a second liquid crystal layer on an upper surface of the second lower board;

a first upper board on the first liquid crystal layer; and a second upper board on the second liquid crystal layer;

wherein said notches are filled with a seal material that seals the first lower board and the second lower board to each other along the edge surface of the first lower board and the edge surface of the second lower board and that seals first upper board to the second upper board above the edge surface of the first lower board and the edge surface of the second lower board.

* * * * *